US008775651B2

(12) United States Patent
Brown et al.

(10) Patent No.: US 8,775,651 B2
(45) Date of Patent: Jul. 8, 2014

(54) SYSTEM AND METHOD FOR DYNAMIC ADAPTATION SERVICE OF AN ENTERPRISE SERVICE BUS OVER A COMMUNICATION PLATFORM

(75) Inventors: Matthew E. Brown, Aurora, CO (US); Robert J. Bork, Aurora, CO (US); Walid A. Al-Masyabi, Aurora, CO (US)

(73) Assignee: Raytheon Company, Waltham, MA (US)

( * ) Notice: Subject to any disclaimer, the term of this patent is extended or adjusted under 35 U.S.C. 154(b) by 621 days.

(21) Appl. No.: 12/333,703

(22) Filed: Dec. 12, 2008

(65) Prior Publication Data

US 2010/0150169 A1   Jun. 17, 2010

(51) Int. Cl.
*G06F 15/16* (2006.01)
(52) U.S. Cl.
USPC ......................................................... 709/230
(58) Field of Classification Search
USPC ............... 709/202, 206, 223, 230, 224, 203; 370/469, 230; 713/192; 707/3; 705/8; 702/186
See application file for complete search history.

(56) References Cited

U.S. PATENT DOCUMENTS

| 5,638,517 | A | 6/1997 | Bartek et al. ............. 395/200.18 |
| 5,946,311 | A | 8/1999 | Alexander, Jr. et al. ...... 370/395 |
| 5,951,649 | A | 9/1999 | Dobbins et al. ............... 709/238 |
| 6,223,227 | B1 | 4/2001 | Williamson et al. ......... 709/315 |
| 6,466,992 | B2 | 10/2002 | Williamson et al. ......... 709/315 |
| 6,502,213 | B1 | 12/2002 | Bowman-Amuah ........... 714/49 |
| 6,505,241 | B2 | 1/2003 | Pitts ............................. 709/218 |
| 6,584,611 | B2* | 6/2003 | Babaian et al. ............... 717/155 |
| 6,587,836 | B1 | 7/2003 | Ahlberg et al. ................. 705/26 |
| 6,606,708 | B1 | 8/2003 | Devine et al. ................. 713/201 |
| 6,681,243 | B1* | 1/2004 | Putzolu et al. ................ 709/202 |
| 6,842,906 | B1 | 1/2005 | Bowman-Amuah .......... 719/330 |
| 7,020,797 | B2 | 3/2006 | Patil .................................. 714/4 |
| 7,107,347 | B1 | 9/2006 | Cohen ........................... 709/229 |
| 7,130,891 | B2 | 10/2006 | Bernardin et al. ............ 709/218 |

(Continued)

FOREIGN PATENT DOCUMENTS

| JP | 2001-60157 | 3/2001 | ............. G06F 13/00 |
| WO | WO 00/38389 A2 | 6/2000 | ............. H04L 29/00 |
| WO | WO 2006/135777 A1 | 12/2006 | ............. G06F 15/16 |

OTHER PUBLICATIONS

Arnaud Simon and Thomas Rischbeck. 2006. Service Contract Template. In Proceedings of the IEEE International Conference on Services Computing (SCC '06). IEEE Computer Society, Washington, DC, USA, 511-.*

(Continued)

*Primary Examiner* — Imad Hussain
(74) *Attorney, Agent, or Firm* — Cantor Colburn LLP (57) ABSTRACT

A method for implementing a dynamic adaptation service includes initializing a plurality of services of an enterprise service bus (ESB). At least one service of the plurality of services being initialized is a dynamic adaptation service. The method also includes receiving at the dynamic adaptation service a first request from a user requesting adaptation between a first client and a first service. The method further includes identifying a first protocol used by the first service and a second protocol used by the first client. The method additionally includes determining at least one adapter to use to adapt messages communicated between the first client using the first protocol and the first service using the second protocol. The method also includes creating a new adapter service through which the first client connects to the first service via the at least one adapter.

20 Claims, 4 Drawing Sheets

(56) References Cited

U.S. PATENT DOCUMENTS

| | | | |
|---|---|---|---|
| 7,225,249 B1 | 5/2007 | Barry et al. | 709/224 |
| 7,363,374 B2 | 4/2008 | Paul et al. | 709/226 |
| 7,428,723 B2 | 9/2008 | Greene et al. | 717/103 |
| 7,457,865 B2 | 11/2008 | Ramakrishnan et al. | 709/224 |
| 7,467,389 B2 | 12/2008 | Mukkamala et al. | 719/316 |
| 7,483,438 B2 | 1/2009 | Serghi et al. | 370/401 |
| 7,487,509 B2 | 2/2009 | Hugly et al. | 719/310 |
| 7,487,512 B2 | 2/2009 | Brunswig et al. | 719/318 |
| 7,516,227 B2 | 4/2009 | Cohen | 709/228 |
| 7,552,205 B2 | 6/2009 | Lamb et al. | 709/223 |
| 7,559,065 B1 | 7/2009 | Sosnovsky et al. | 719/318 |
| 7,634,553 B2 | 12/2009 | Simpson et al. | 709/220 |
| 7,644,184 B2 | 1/2010 | Arora et al. | 709/246 |
| 7,707,432 B2* | 4/2010 | Colle et al. | 713/192 |
| 2001/0014881 A1 | 8/2001 | Drummond et al. | 705/43 |
| 2003/0061385 A1 | 3/2003 | Gonze | 709/246 |
| 2003/0074413 A1 | 4/2003 | Nielsen et al. | 709/206 |
| 2003/0093479 A1 | 5/2003 | Mellen-Garnett et al. | 709/205 |
| 2004/0156378 A1 | 8/2004 | Walls et al. | 370/412 |
| 2004/0186891 A1 | 9/2004 | Panec et al. | 709/206 |
| 2004/0205205 A1 | 10/2004 | Patterson | 709/229 |
| 2004/0210320 A1 | 10/2004 | Pandya | 700/1 |
| 2005/0010661 A1 | 1/2005 | Southam et al. | 709/224 |
| 2005/0021689 A1 | 1/2005 | Marvin et al. | 709/220 |
| 2005/0246153 A1 | 11/2005 | Genkin et al. | 703/22 |
| 2006/0015584 A1 | 1/2006 | Ocko et al. | 709/219 |
| 2006/0047496 A1 | 3/2006 | Genkin et al. | 703/22 |
| 2006/0067209 A1* | 3/2006 | Sheehan et al. | 370/216 |
| 2006/0074618 A1 | 4/2006 | Miller et al. | 703/13 |
| 2006/0123474 A1 | 6/2006 | Hagg et al. | 726/12 |
| 2006/0136555 A1 | 6/2006 | Patrick et al. | 709/203 |
| 2006/0282502 A1 | 12/2006 | Koshak | 709/206 |
| 2007/0201655 A1 | 8/2007 | Shenfield | 379/201.01 |
| 2007/0201665 A1* | 8/2007 | Kocan et al. | 379/201.02 |
| 2007/0204078 A1* | 8/2007 | Boccon-Gibod et al. | 710/54 |
| 2007/0226231 A1* | 9/2007 | Venkat | 707/100 |
| 2007/0239420 A1 | 10/2007 | Papaefstathiou et al. | 703/14 |
| 2007/0263534 A1* | 11/2007 | Pavlick | 370/230 |
| 2008/0120380 A1* | 5/2008 | Boyd et al. | 709/206 |
| 2008/0130682 A1 | 6/2008 | Akadiri | 370/469 |
| 2008/0140759 A1* | 6/2008 | Conner et al. | 709/201 |
| 2008/0140760 A1* | 6/2008 | Conner et al. | 709/201 |
| 2008/0140857 A1* | 6/2008 | Conner et al. | 709/236 |
| 2008/0162709 A1* | 7/2008 | Hrischuk et al. | 709/230 |
| 2008/0216090 A1 | 9/2008 | Currie et al. | 719/313 |
| 2009/0006167 A1* | 1/2009 | Toussaint et al. | 705/8 |
| 2009/0018998 A1* | 1/2009 | Patten et al. | 707/3 |
| 2009/0055888 A1* | 2/2009 | Little | 726/1 |
| 2009/0070456 A1* | 3/2009 | Brown et al. | 709/224 |
| 2009/0077251 A1* | 3/2009 | Brown et al. | 709/230 |
| 2009/0292797 A1* | 11/2009 | Cromp et al. | 709/223 |
| 2009/0327796 A1* | 12/2009 | Ramanathan et al. | 714/2 |
| 2010/0057403 A1* | 3/2010 | Vecera et al. | 702/186 |
| 2010/0057835 A1* | 3/2010 | Little | 709/203 |

OTHER PUBLICATIONS

Xiaoying Bai; Jihui Xie; Bin Chen; Sinan Xiao; , "DRESR: Dynamic Routing in Enterprise Service Bus," e-Business Engineering, 2007. ICEBE 2007. IEEE International Conference on , vol., No., pp. 528-531, Oct. 24-26, 2007.*

Bin Wu; Shijun Liu; Lei Wu; , "Dynamic Reliable Service Routing in Enterprise Service Bus," Asia-Pacific Services Computing Conference, 2008. APSCC '08. IEEE , vol., No., pp. 349-354, Dec. 9-12, 2008.*

Stam, Kurt. "JBossESBHotDeployment". JBoss Community. Aug. 15, 2007. pp. 1-2.*

*Is Layering Harmful?*; Jon Crowcroft, et al.; IEEE Network Magazine; pp. 20-24, Jan. 1992.

*The Transport Layer: Tutorial and Survey*; ACM Computing Surveys, vol. 31, No. 4; Sami Iren, et al.; pp. 360-405, Dec. 1999.

*Some Internet Architectural Guidelines and Philosophy*; The Internet Society; R. Bush, et al.; pp. 1-28, Dec. 2002.

PCT Notification of Transmittal of the International Search Report and the Written Opinion of the International Searching Authority for International Application No. PCT/US2006/022537; 10 pages, Nov. 6, 2006.

USPTO; Office Action for U.S. Appl. No. 11/149,846 in the name of Richard L. Koshak; 13 pages, Jul. 16, 2008.

PCT Written Opinion of the International Searching Authority for International Application No. PCT/US07/80841; 4 pages, Jul. 25, 2008.

USPTO; Office Action for U.S. Appl. No. 11/149,846 in the name of Richard L. Koshak; 15 pages, Mar. 31, 2009.

USPTO; Office Action for U.S. Appl. No. 11/149,846 in the name of Richard L. Koshak; 40 pages, Jul. 23, 2009.

USPTO; Office Action for U.S. Appl. No. 11/149,846 in the name of Richard L. Koshak; 40 pages, Mar. 3, 2010.

USPTO; Advisory Action Before the Filing of an Appeal Brief for U.S. Appl. No. 11/149,846 in the name of Richard L. Koshak; 14 pages, May 12, 2010.

USPTO; Office Action for U.S. Appl. No. 11/149,846 in the name of Richard L. Koshak; 28 pages, Jun. 30, 2010.

USPTO; Office Action for U.S. Appl. No. 11/149,846 in the name of Richard L. Koshak; 33 pages, Dec. 30, 2010.

* cited by examiner

SYSTEM AND METHOD FOR DYNAMIC ADAPTATION SERVICE OF AN ENTERPRISE SERVICE BUS OVER A COMMUNICATION PLATFORM

TECHNICAL FIELD

This disclosure relates in general to protocol mediation, and more specifically, to a dynamic adaptation service.

BACKGROUND

Service oriented architecture (SOA) is an architectural design pattern that defines loosely-coupled relationships between producers and consumers of data and services. One component of SOA is mediation, specifically transport protocol mediation, also known as adaptation. Currently, adaptation requires trained integration engineers to install and/or configure services into an Enterprise Service Bus (ESB) or similar transport mediation construct. Once a service is installed and/or configured, the ESB is able to facilitate communication between different protocols. Unfortunately, installing and/or configuring ESB services often requires significant effort and specific knowledge, especially when multiple legacy services are being exposed for use in a single SOA. Legacy services might use FTP or TCP/IP transport protocols and must be adapted to be included in a SOA using, as an example, web services such as SOAP over HTTP.

SUMMARY

According to one embodiment, a method for implementing a dynamic adaptation service includes initializing a plurality of services of an enterprise service bus (ESB). At least one service of the plurality of services being initialized is a dynamic adaptation service. The method also includes receiving at the dynamic adaptation service a first request from a user requesting adaptation between a first client and a first service. The method further includes identifying a first protocol used by the first service and a second protocol used by the first client. The method additionally includes determining at least one adapter to use to adapt messages communicated between the first client using the first protocol and the first service using the second protocol. The method also includes creating a new adapter service through which the first client connects to the first service via the at least one adapter.

Technical advantages of particular embodiments may include allowing legacy service owners to quickly and easily create new adapter services that make various other services (e.g. legacy services) available without requiring any additional software or hardware in the user domain. This may be achieved by describing transport protocols and connection requirements via a human machine interface. The user may then be able to expose the service to any device, service, or application that is able to connect to the network. Another technical advantage of particular embodiments may include minimizing the delay in exposing services to the enterprise, the ESB, or the network by providing a way to dynamically create web services and transport protocol adapters. This may reduce the reliance on integration engineers and allow service creators and owners to easily transition their services into a service oriented architecture.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of the present disclosure and its features and advantages, reference is now made to the following description, taken in conjunction with the accompanying drawings, in which.

DESCRIPTION OF EXAMPLE EMBODIMENTS

Embodiments of the present disclosure and their advantages are best understood by referring to FIGS. 1 through 4 of the drawings, like numerals being used for like and corresponding parts of the various drawings.

Figure 1:
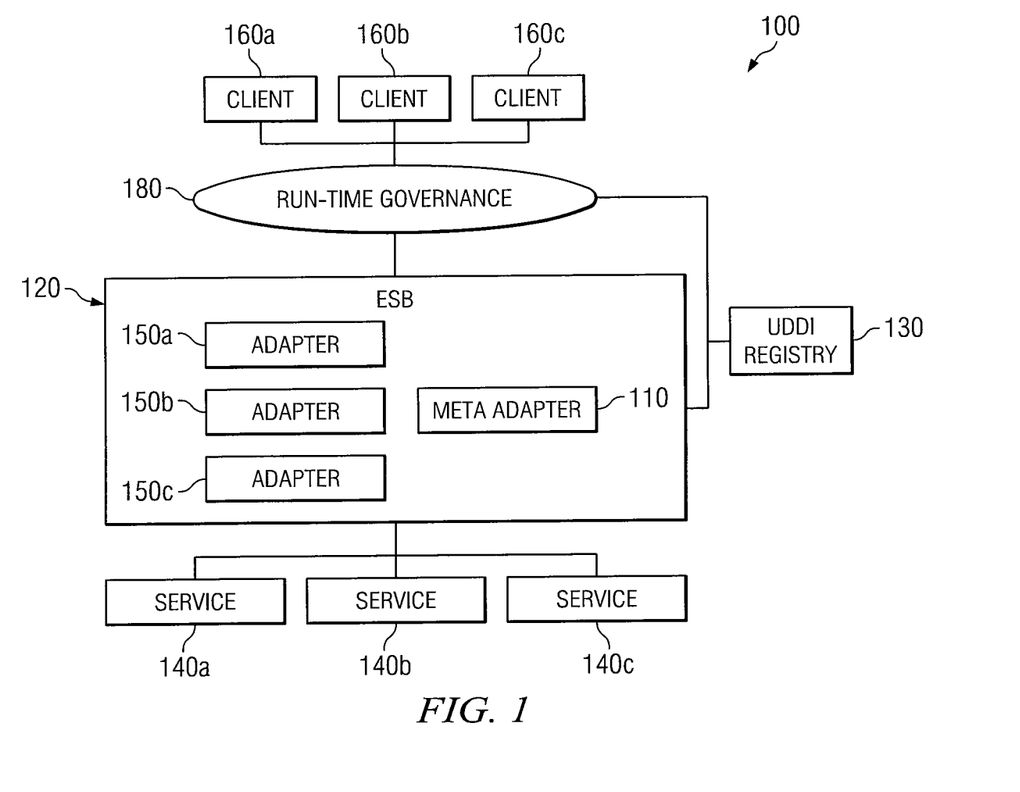
FIG. 1 depicts a block diagram of components used in an example system 100 for providing implementation of a dynamic adaptation service, in accordance with a particular embodiment.

FIG. 1 depicts a block diagram of components used in an example system 100 for providing implementation of a dynamic adaptation service, in accordance with a particular embodiment. In the embodiment depicted in FIG. 1, system 100 may implement a service oriented architecture (SOA) that includes several clients 160, services 140, and adapter services 150, which are connected to one another via ESB 120. While ESB 120 may not implement a SOA itself but may provide the features and capabilities with which the SOA may be implemented. ESB 120, along with UDDI registry 130, runtime governance 180, and MetaAdapter 110, may provide a simple means for dynamically configuring adaptation without requiring the services of a trained integration engineer. The adaptation between services 140 and clients 160 may be accomplished through the use of adapter services 150. More specifically, a dynamic adaptation service, such as Meta-Adapter 110, along with an appropriate application program interface, may provide a way for a user to configure one or more of adapter services 150 for use between clients 160 and services 140.

In certain embodiments, MetaAdapter 110 may allow for adaptation to be done with minimal input from the user, who need not have integration engineering training. More specifically, the user may simply provide MetaAdapter 110 with some specifics (e.g., the protocols used, location information, etc.) about the service 140 and the client 160 that he wants adapted. MetaAdapter 110 then determines what adapters may be needed or used, creates a new adapter service 150, updates an ESB configuration file (not depicted), and registers the new adapter service with Universal Description, Discovery, and Integration (UDDI) registry 130. Once registered, the service becomes discoverable by any of clients 160. Thus, the user is able to provide clients 160 with access to one of services 140 with only minimal basic knowledge of the service 140 to be adapted and/or the clients 160 that may be accessing the services.

ESB 120 may comprise hardware, software, encoded logic, or any combination thereof. ESB 120 may provide clients 160 with access to services 140 even though they may use different protocols, messages, and/or data formats. This may be accomplished, in part, through the use of the adapters and adapter services 150 which may adapt between protocols by mapping fields from one protocol to another. In particular embodiments, ESB 120 may provide one or more of transport protocol conversion, data format conversion, service policy enforcement, content based routing (e.g., where messages are sent to particular services based on the content of the message), and/or any other service, feature, or conversion desired. For example, ESB 120 may be pre-configured with several different adapters 150 that may be mapped so as to transform, adapt, convert, and/or translate between different protocols, data formats, services and/or clients.

ESB 120 may also include an ESB configuration file that includes, among other things, information related to the adapter services 150 supported by ESB 120. While ESB 120 may be pre-configured with several different adapters, it is not until a particular adapter service 150 is set up that the adapters become functional. More specifically, without the specific details provided by adapter services 150, ESB 120's adapters do not know what messages to adapt, how to adapt them, where to send them once adapted, or where to listen for those messages. In particular embodiments, ESB 120 may also provide an abstraction layer on top of an implementation of an enterprise messaging system.

In a typical ESB, adding new services requires detailed knowledge of how the ESB and its adapters work. Accordingly, particular embodiments provide a dynamic adaptation service, MetaAdapter 110, that allows a user to simply provide information regarding the service and/or client to be adapted. MetaAdapter 110 may then set up virtual endpoints that may be used to access the new services. In particular embodiments, the use of MetaAdapter 110 may facilitate in modifying a standard ESB to allow "hot deployment" of new services (e.g., new services may be deployed without having to restart ESB 120).

UDDI registry 130 may comprise hardware, software, encoded logic, or any combination thereof. UDDI registry 130 may maintain a registry of services supported by ESB 120, including new services created by MetaAdapter 110. The information stored by UDDI registry 130 may allow clients 160 to discover and use services 140 via adapter services 150.

A service may be registered with UDDI registry 130 using a UDDI standard with which UDDI registry 130 conforms. The registration may provide key information about the service (e.g., any descriptive information that was provided by an integration operator upon creation of the new service). In particular embodiments, the information stored by UDDI registry 130 may include information related to a virtual endpoint created for a particular service (e.g., a new adapter service) and any additional information that may be provided by a user (e.g., a description of the service, contact information for the creator of the service, identification of the protocols being adapted, specific WSDL information for connecting to the service, etc.) configuring a respective adaptation. This user may be referred to as an integration operator.

In particular embodiments, UDDI registry 130 may be updated via runtime governance 180 or a web service. Because it is based on the UDDI standards, interfacing with UDDI registry 130 via a web service may be a relatively straightforward process.

Once a service, for example service 140b, has been registered, runtime governance 180 may be able to dynamically discover the service. A default set of policies may be applied to service 140b just as they were applied to previously established services. For example, a default security policy for encryption authentication and authorization as well as policies for metric collection may be enforced on new services.

Runtime governance 180 may comprise hardware, software, encoded logic, or any combination thereof. In particular embodiments, runtime governance 180 may be able to discover new services registered with UDDI registry 130 and to configure and/or manage virtual endpoints associated with the new services, as well as the existing services.

In certain embodiments, when client 160a wants to use, for example, service 140b, client 160a may interact with the virtual endpoint associated with service 140b. In some embodiments, the virtual endpoints may be considered mediators. The virtual endpoint may allow client 160a to interact with service 140b, even though client 160a and service 140b may not be directly compatible. This interaction may be done without client 160a or service 140b knowing that they are not directly compatible with each other. In other words, the virtual endpoint may allow client 160a to communicate with service 140b using one set of messages, protocols, and/or data formats without knowing what type of messages, protocols, and/or data formats are used by service 140b.

Adapter services 150 may comprise hardware, software, encoded logic, or any combination thereof. Adapter services 150 may provide a way to adapt, transform or translate messages from one protocol, type, or format to another protocol, type, or format. Adapter services 150 may be part of ESB 120 and may use ESB 120's adapters.

In particular embodiments, one or more of adapter services 150 may have been created in response to an adaptation request from a user (e.g., an integration operator). More specifically, when a user requests to adapt a service, for example, service 140c, adapter service 150c may be created and initialized to facilitate in the sending/receiving of messages between a client (e.g., one or more of clients 160) and service 140c.

In some embodiments, besides the adapters, ESB 120 may also comprise information indicating how to adapt from one protocol or format to another. This information may be used along with specific information provided by the user about the client and the service to create the new adapter service 150c.

Services 140 may comprise hardware, software, encoded logic, or any combination thereof. Depending on the embodiment, services 140 may be any program, routine, subroutine, software, software system, or encoded logic designed to support interoperable machine-to-machine interaction over a network. For example, services 140 may comprise different APIs (e.g., a Spanish-to-English translation service, an account status service, and a data analysis service) that can be accessed over a network and executed on a remote system hosting the requested service.

Unfortunately, not every client 160 may be able to natively support the format, protocol and/or type of messages used by a particular service 140. To address this potential incompatibility, ESB 120 may operate as a mediator to adapt between services 140 and clients 160. MetaAdapter 110 may allow for new adaptations to be created and deployed on the fly.

Clients 160 may comprise hardware, software, encoded logic, or any combination thereof. Depending on the scenario, clients 160 may comprise different instances of the same program, different programs, or a combination of the two. Furthermore, each instance may be run on the same or different device. For example, clients 160 may be three separate web browser windows all being run from the same computer, or client 160a may be a first browser on a first computer, client 160b may be an email program on the first computer, and client 160c may be a second browser on a laptop.

In some embodiments, clients 160 may communicate with runtime governance 180 to access a particular service. More specifically, a client may communicate with a virtual endpoint that is associated with a particular service. The virtual endpoint may have been set up by runtime governance 180 in response to an earlier request sent to MetaAdapter 110 by an integration operator requesting that the service be adapted for use by the now requesting client 160.

MetaAdapter 110 of dynamic adaptation service 100 may comprise hardware, software, encoded logic, or any combination thereof. In particular embodiments, MetaAdapter 110 may be a service running on ESB 120, similar to any of services 140. In particular embodiments, MetaAdapter 110 may be a service that is initialized when ESB 120 is started to allow MetaAdapter 110 to be available to any of clients 160. In particular embodiments, MetaAdapter 110 may allow a user to specify an IP address, port number, or any other identifier of the location of the service to be adapted, protocol, format and/or content of messages used by a client, and/or service to be adapted.

Based on the information provided by the user, MetaAdapter 110 may cause a virtual endpoint to be established and maintained by runtime governance 180. The virtual endpoint may be associated with the service specified by the user and may be able to receive, understand, and/or translate messages from the client as specified by the user.

A user may utilize an appropriate Application Program Interface (API) (e.g., a web service interface) to provide certain details about a service to be made accessible by one or more of clients 160 and how clients 160 may attempt to access the service. The details may include information related to the type of service and/or client (e.g., a web browser, an email program), the protocols used by the client and/or service (e.g., HTTP, SOAP, FTP, TCP/IP), and/or the location of the client and/or service (e.g., an IP address). Using this information MetaAdapter 110 may be able to determine which adapter service 150 to use to adapt client 160 to the appropriate service 140. The MetaAdapter 110 may allow for ESB configuration files to be read in on the fly without having to restart the ESB. This may provide a new adapter service that maps the different protocols that the user wants to connect/adapt between.

Though not depicted in FIG. 1, any of clients 160 and/or services 140 may have access to or be available through a network, such as network 240 described below with respect to FIG. 2.

Figure 2:
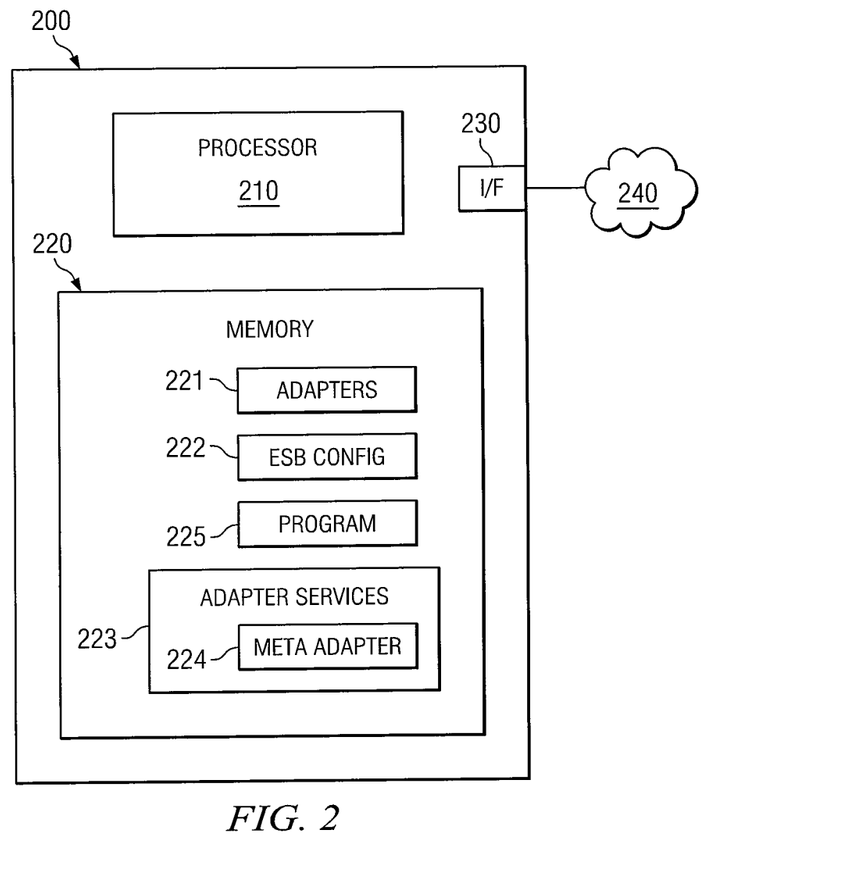
FIG. 2 illustrates a block diagram of a computer implementing an Enterprise Service Bus, in accordance with a particular embodiment.

FIG. 2 illustrates a block diagram of a computer implementing an Enterprise Service Bus, in accordance with a particular embodiment. Computer 200 comprises processor 210, memory 220, and interface 230. In different embodiments, computer 200 may comprise additional, fewer, or different components. The components of computer 200 may work together in order to provide ESB functionality, such as providing interoperability between services and clients. Within memory 220 are adapters 221, ESB configuration file 222, Adapter services 223, which includes MetaAdapter 224, and program 225.

Computer 200 is coupled to network 240. Network 240 may comprise hardware, software, encoded logic, or any combination thereof. The term "network" should be interpreted as generally defining any network or combination of networks capable of transmitting signals, data, and/or messages, including, but not limited to, signals, data or messages transmitted through WebPages, e-mail, text chat, voice over IP (VOIP), and instant messaging. Depending on the scope, size, and/or configuration, network 240 (or any of its constituent networks) may be implemented as a LAN, WAN, MAN, PSTN, globally distributed network such as the Internet, Intranet, Extranet, or any other form of wireless or wired networking. Generally, network 240 provides for the communication of packets, cells, frames, or other portions of information (generally referred to as packets herein) between the various components. More specifically, network 240 may couple any clients being serviced by the ESB implemented via computer 200 to any of the services supported by the ESB.

Computer 200 may be a standalone computer (e.g., a personal computer) that also is used for typical desktop applications, a standalone computer that has been configured to solely provide ESB functionality, a dedicated component designed to provide ESB functionality, or any other device or component which may be configured, programmed, or designed to provide ESB functionality.

Processor 210 may be a microprocessor, controller, or any other suitable computing device, resource, or combination of hardware, software, and/or encoded logic operable to provide ESB functionality, either alone or in conjunction with other computer 200 components, such as memory 220. ESB functionality may include providing a way for a user to dynamically and automatically configure an adapter service for adaptation between a particular service and one or more clients without having to enlist the help of a trained integration engineer. For example, processor 210 may determine what service a client has requested and what adapter is needed to allow the client to communicate with the service. As another example, processor 210 may determine how to configure the adapter service and the resources and/or tools needed to provide adaptation between a client and the service based on information received from a user via interface 230.

Memory 220 may be any form of volatile or non-volatile memory including, without limitation, magnetic media, optical media, random access memory (RAM), read-only memory (ROM), flash memory, removable media, or any other suitable local or remote memory component or components. Memory 220 may store any suitable data or information utilized by computer 200, including software embedded in a tangible computer readable medium, and/or encoded logic incorporated in hardware or otherwise stored (e.g., firmware).

Some of the information stored by memory 220 may be used by processor 210 in determining how to adapt a new service for use by one or more clients. For example, program 225 may store instructions used by processor 210 to process a request from a user to create a new adapter service. Program 225 may also provide instructions on how to call/run MetaAdapter service 224, stored by adapter services 223, to configure the requested service so that it is available to other clients and stored within adapter services 223. Program 225 may further provide processor 210 with instructions on how to select the appropriate adapter from among adapters 221.

Memory 220 may also be used to store configuration files for the ESB as shown by ESB configuration file 222. ESB configuration file 222 may be used in setting up the ESB's adapter services 223 to adapt between different protocols, data formats, and/or message types. Adapter services 223 may comprise the different adapter services currently being supported by ESB 200. This may include MetaAdapter 224 which may be used to establish new adapter services on the fly without having to restart the entire ESB 200.

Interface 230 may be any combination of hardware, software or encoded logic used to send and receive data, messages or any other type of communication that an ESB may use. For example, interface 230 may receive a request from a user to adapt a new service for use by certain clients. As another example, interface 230 may send and/or receive messages from clients and/or services that need to be adapted in order to facilitate communication between the client and the service.

Figure 3:
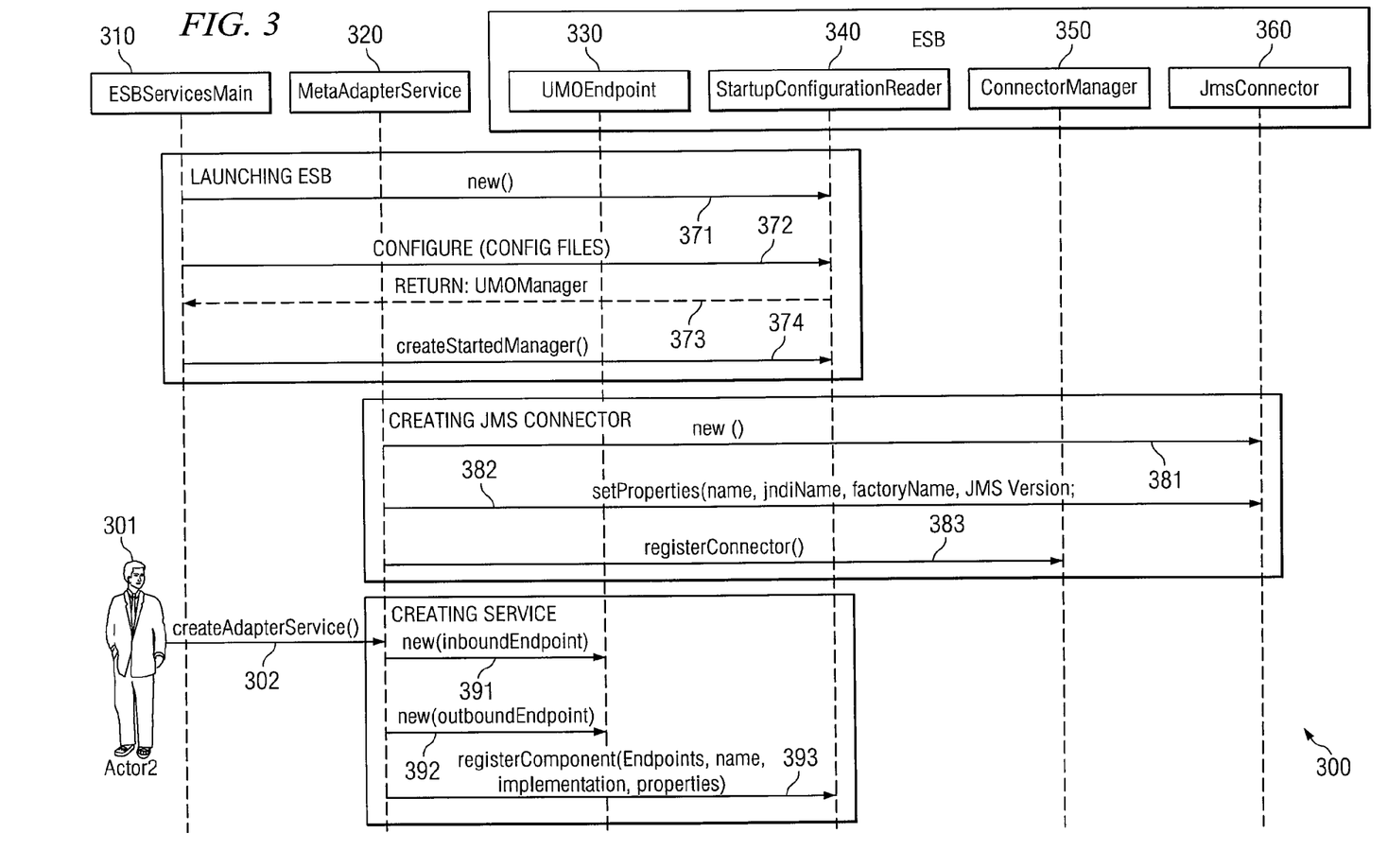
FIG. 3 depicts a signaling diagram illustrating a flow of signals between functional components used in an example implementation of a dynamic adaptation service, in accordance with a particular embodiment.

FIG. 3 depicts a signaling diagram illustrating a flow of signals between functional components used in an example implementation of a dynamic adaptation service, in accordance with particular embodiments. While signaling diagram 300 illustrates several different messages/signals that may be sent between different components, it should be understood that FIG. 3 does not illustrate every message, or every component that may be used in a particular embodiment. Furthermore, in the example signaling depicted in FIG. 3, a new service is created that uses a JMS connector. The ESB did not have the JMS connector configured at the time, thus the signaling diagram includes messages used to configure the new JMS connector. Other embodiments may use different protocols having different connectors or channels.

Signaling diagram 300 includes ESBServicesMain 310, MetaAdapterService 320, UMOEndpoint 330, StartupConfigurationReader 340, ConnectorManager 350 and JMSConnector 360. ESBServicesMain 310 may be used to initialize and/or startup the ESB and any of its services. MetaAdapterService 320 may be an ESB service initialized by ESBServicesMain 310. In particular embodiments, user 301 may use MetaAdapterService 320 to create a new service that adapts a particular service for use by different clients.

UMOEndpoint 330 may be a virtual endpoint used by a client to access new and existing services supported by the ESB. More specifically, when a client wants to use an adapted service supported by the ESB, the client may communicate with the virtual endpoint. StartupConfigurationReader 340 may be used to read the specific configuration files needed for the ESB at startup. ConnectorManager 350 may be used to track, monitor, or otherwise manage the various different connectors supported by the ESB. JMSConnector 360 may be used in receiving requests from clients or publishing messages for clients.

For purposes of this signaling diagram, it may be assumed that the ESB and its associated services have already been started. Thus, MetaAdapterService 320 may be available to receive messages from user 301. More specifically, when user 301 wishes to create a new service he may send createAdapterService message 302 to MetaAdapterService 320. createAdapterService message 302 may contain information about the new service such as the protocols that are used, the identity and/or location of the inbound and outbound endpoints, the formatting and/or types of messages or data that the service needs to support, and/or any other information that may be relevant or useful in creating the new service. This information may be retrieved from user 301 through an appropriate API.

Based on the information in createAdapterService message 302 as well as information otherwise accessible by MetaAdapterService 320, MetaAdapterService 320 may send new message 391 and new message 392 to UMOEndpoint 330. Messages 391 and 392 may provide information about an inbound endpoint and an outbound endpoint. Messages 391 and 392 may be used to establish one or more virtual endpoints with which the adapted service and the client may use to communicate with one another. The information within messages 391 and 392 may include information related to how a client or service is to communicate with the virtual endpoint, where the client or service is to direct its communications, and any other information that may be useful in creating the new endpoints.

MetaAdapterService 320 may also send registerComponent message 393 to StartupConfigurationReader 340. Message 393 may supply StartupConfigurationReader 340 with information it may use to allow the ESB to make the new service available to any relevant clients connected to the ESB. For example, the information may include details regarding the virtual endpoint with which a client may communicate, the name of the adapted service, various implementation properties such as the protocol, and/or types of messages to use.

Once MetaAdapterService 320 has transmitted the various messages needed to create the new service, ESBServicesMain 310 may perform a pseudo restart of the ESB. The pseudo restart may allow the new service to be added to the ESB without having to first stop the ESB and restart the other services. This may be referred to as hot deployment. Because neither the ESB nor any of its services have to be taken down, hot deployment quickens the deployment process and reduces the impact to clients and/or services that may be using the ESB.

The restart of the ESB may begin with the transmittal of new message 371 by ESBServicesMain 310. New message 371 may be sent to StartupConfigurationReader 340 to indicate that a new service has been requested and is to be setup. Then configure message 372 may be sent to StartupConfigurationReader 340. Configure message 372 may provide StartupConfigurationReader 340 with any information it may need to configure the new service so as to be accessible to the various clients serviced by the ESB. For example, in particular embodiments configure message 372 may include configuration files. In particular embodiments, configure message 372 may comprise configuration information only for the new service because any other existing services have already been configured (e.g., during startup or a previous pseudo restart).

StartupConfigurationReader 340 may then send RETURN: ConnectorManager which may return a master object (MO) that may be used later to register newly created connectors. Then, ESBServicesMain 310 may transmit createStartedManager to restart the ESB and make the new service available. As mentioned above, in restarting the ESB only the new service is set up, while the other services remain active without being restarted. Once the new adapter service is available, clients may begin to use the adapter service to access the respective service being adapted.

As mentioned above, in this particular scenario the requested new service requires the use of a new connector. Accordingly, MetaAdapterService 320 sends new message 381 to JMSConnector 360 to indicate that a new connector is needed. Then, setProperties message 382 is sent to JMSConnector 360. setProperties message 382 may include information needed to set-up and/or configure the new connector. For example, the message may include information such as name, jndiName, factoryName, and JMS Version. Finally, MetaAdapterService 320 may send registerConnector message 383 to ConnectorManager 350. This may allow the new connector to be accessible by the various clients serviced by the ESB. In particular embodiments, the JMS connector may listen for messages from clients to determine if adaptation is needed and which adapter services may be needed.

Figure 4:
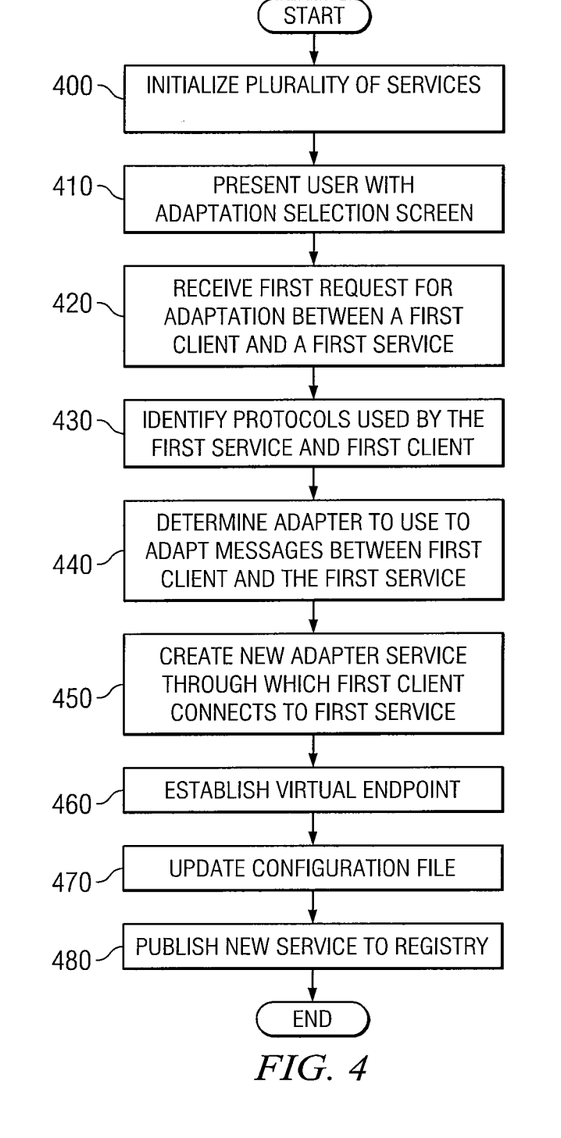
FIG. 4 depicts a method for implementing a dynamic adaptation service, in accordance with a particular embodiment.

FIG. 4 depicts a method for implementing a dynamic adaptation service. The method begins at step 400 where a plurality of services are initialized. At least one of the initialized services is a dynamic adaptation service, such as MetaAdapter 110. By initializing a MetaAdapter it may be possible for a user to deploy a new service and configure MetaAdapter to set up any adaptation that may be needed for existing legacy clients. In particular embodiments, only the dynamic adaptation service may be initially initialized, additional services may then be added dynamically, as needed.

At step 410 a user is presented with an adaptation selection screen. The user may interact with the adaptation selection screen to generate adaptation requests. For example, the adaptation selection screen may present the user with a list of available or known clients, services, and/or adapters from which the user is able to select a desired adaptation. In particular embodiments, the user may use the adaptation selection screen to tell the MetaAdapter service where the desired service is physically located (e.g., IP address) and how the service is called (e.g., HTTP JMS, FTP).

At step 420 the ESB or the MetaAdapter receives a first request from a user requesting adaptation between a first client and a first service. The request, and any of its included information, may have been formed during step 410 as the user interacts with the adaptation selection screen.

At step 430 a first protocol used by a first service and a second protocol used by a first client are identified. Depending on the embodiment, this information may be included, either explicitly or implicitly, in the request received at step 420. For example, the request may explicitly provide that the first service uses HTTP. As another example, the request may simply identify a particular client, and the MetaAdapter may implicitly know that the particular client uses FTP.

At step 440 at least one adapter is determined to be used to adapt messages communicated between the first client using the first protocol and the first service using the second protocol. In some embodiments, the ESB may have stored in memory a list of available adapters and how they are used. Accordingly, step 440 may simply involve searching the list for an adapter designed to adapt between the first and second protocol. The memory may also store the adapters needed for the connection.

At step 450 a new adapter service is created through which the first client connects to the first service via the at least one adapter. The new adapter service may be configured based on information stored in the memory, including information related to the adapter identified in step 440. Although the new adapter service is created, it may not yet ready to be used by a client because the client may not be aware of the adapter service.

At step 460 a virtual endpoint is established. The virtual endpoint may be used by the first client to connect to the new adapter service. In doing so, the client may communicate with the virtual endpoint as though the virtual endpoint was the first service. More specifically, from the perspective of the first client the virtual endpoint is the first service, and it uses a protocol/format/message type that the first client understands.

At step 470 at least one configuration file associated with the ESB is updated. This update, in essence, makes the ESB aware of the new adapter service, thus incorporating the new adapter service as part of the ESB.

At step 480 the new adapter service is published to a registry associated with the ESB. Once published it may be possible for the Client to discover the new adapter service, and thus the first service. For example, the next time the first client checks the UDDI registry it may find the new adapter service. In some embodiments, the Client may be provided with a list of options from which they select what services they want to connect between.

Some of the steps illustrated in FIG. 4 may be combined, modified or deleted where appropriate, and additional steps may also be added to the flowchart. Additionally, steps may be performed in any suitable order without departing from the scope of particular embodiments.

While various implementations and features are discussed with respect to multiple embodiments, it should be understood that such implementations and features may be combined in various embodiments. For example, features and functionality discussed with respect to a particular figure, such as FIG. 2, may be used in connection with features and functionality discussed with respect to another such figure, such as FIG. 1, according to operational needs or desires. As another, any of the elements discussed above may be provided as separate external components to computer 200 or each other where appropriate. Particular embodiments contemplate great flexibility in the arrangement of these elements as well as their internal components.

Numerous other changes, substitutions, variations, alterations and modifications may be ascertained by those skilled in the art and it is intended that various embodiments encompass all, some, or none of such changes, substitutions, variations, alterations and modifications as falling within the spirit and scope of the appended claims.

What is claimed is:

1. A method for implementing a dynamic adaptation service, comprising:
   initializing a plurality of services of an enterprise service bus (ESB), at least one service of the plurality of services being a dynamic adaptation service;
   receiving at the dynamic adaptation service a first request from a user requesting adaptation between a first client and a first service;
   identifying via a MetaAdapter a first protocol used by the first service and a second protocol used by the first client;
   determining via the MetaAdapter at least one adapter to use to adapt messages communicated between the first client using the first protocol and the first service using the second protocol;
   creating via the MetaAdapter a new adapter service through which the first client may connect to the first service via the at least one adapter;
   adding the new adapter service to the ESB via the MetaAdapter without stopping the ESB and restarting the plurality of services of the ESB;
   assigning via the MetaAdapter a Universal Description, Discovery, and Integration (UDDI) registry address to the new adapter service such that new adapter service is accessible by the first client, and publishing via the MetaAdapter the new adapter service having the assigned UDDI registry address to a registry of the ESB;
   applying default security policies for encryption, authentication, and authorization to the new adapter service;
   providing via the MetaAdapter an indication of a plurality of services, including the new adapter service, available through the ESB to the first client; and
   accessing via the first client the new adapter service using the UDDI registry address.

2. The method of claim 1, further comprising presenting the user with an adaptation selection screen, the user interacting with the adaptation selection screen to generate the first request.

3. The method of claim 1, wherein the new service is created without having to shutdown the ESB, without having to re-initialize the ESB and without having to re-initialize the plurality of services.

4. The method of claim 1, further comprising updating at least one configuration file associated with the ESB.

5. The method of claim 1, further comprising publishing the new adapter service to a registry associated with the ESB.

6. The method of claim 1, wherein receiving a first request comprises receiving a first request comprising information indicative of a format of a first message sent by the first client, a location of the first service, and an indication of where to listen for the first message sent by the first client.

7. The method of claim 1, further comprising establishing a virtual endpoint, the virtual endpoint used by the first client to connect to the new adapter service.

8. A system for implementing a dynamic adaptation service, comprising:
a processor operable to initialize a plurality of services during initialization of an enterprise service bus (ESB), at least one service of the plurality of services being a dynamic adaptation service; and
an interface coupled to the processor and operable to receive at the dynamic adaptation service a first request from a user requesting adaptation between a first client and a first service;
wherein the processor executes a MetaAdapter configured to:
identify a first protocol used by the first service and a second protocol used by the first client;
determine at least one adapter to use to adapt messages communicated between the first client using the first protocol and the first service using the second protocol;
create a new adapter service through which the first client may connect to the first service via the at least one adapter;
add the new adapter service to the ESB without stopping the ESB and restarting the plurality of services of the ESB;
assign a Universal Description, Discovery, and Integration (UDDI) registry address to the new adapter service such that new adapter service is accessible by the first client, and publish the new adapter service having the assigned UDDI registry address to a registry of the ESB; and
apply default security policies for encryption, authentication, and authorization to the new adapter service; and
provide an indication of a plurality of services, including the new adapter service, available through the ESB to the first client; and
accessing via the first client the new adapter service using the UDDI registry address.

9. The system of claim 8, wherein the processor is further operable to create the new service without having to shutdown the ESB, without having to re-initialize the ESB and without having to re-initialize the plurality of services.

10. The system of claim 8, wherein the processor is further operable to update at least one configuration file associated with the ESB.

11. The system of claim 8, wherein the processor is further operable to publish the new adapter service to a registry associated with the ESB.

12. The system of claim 8, wherein the interface operable to receive a first request is further operable to receive a first request comprising information indicative of a format of a first message sent by the first client, a location of the first service, and an indication of where to listen for the first message sent by the first client.

13. The system of claim 8, wherein the processor is further operable to establish a virtual endpoint, the virtual endpoint used by the first client to connect to the new adapter service.

14. Logic encoded on a tangible non-transitory computer readable medium that when executed is operable to:
initialize a plurality of services during initialization of an enterprise service bus (ESB), at least one service of the plurality of services being a dynamic adaptation service;
receive at the dynamic adaptation service a first request from a user requesting adaptation between a first client and a first service;
identify a first protocol used by the first service and a second protocol used by the first client;
determine at least one adapter to use to adapt messages communicated between the first client using the first protocol and the first service using the second protocol;
create a new adapter service through which the first client connects to the first service via the at least one adapter;
assign a Universal Description, Discovery, and Integration (UDDI) registry address to the new adapter service such that new adapter service is accessible by the first client, and add the new adapter service to the ESB without stopping the ESB and restarting the plurality of services of the ESB;
publish the new adapter service to a registry of the ESB;
apply default security policies for encryption, authentication, and authorization to the new adapter service; and
provide an indication of a plurality of services, including the new adapter service, available through the ESB to the first client; and
access via the first client the new adapter service using the UDDI registry address.

15. The medium of claim 14, wherein the logic is further operable to present the user with an adaptation selection screen, the user interacting with the adaptation selection screen to generate the first request.

16. The medium of claim 14, wherein the logic is further operable to create the new service without having to shutdown the ESB, without having to re-initialize the ESB and without having to re-initialize the plurality of services.

17. The medium of claim 14, wherein the logic is further operable to update at least one configuration file associated with the ESB.

18. The medium of claim 14, wherein the logic is further operable to publish the new adapter service to a registry associated with the ESB.

19. The medium of claim 14, wherein the logic operable to receive a first request is further operable to receive a first request comprising information indicative of a format of a first message sent by the first client, a location of the first service, and an indication of where to listen for the first message sent by the first client.

20. The medium of claim 14, wherein the logic is further operable to establish a virtual endpoint, the virtual endpoint used by the first client to connect to the new adapter service.

* * * * *